United States Patent
Davidson

[19]

[11] Patent Number: 6,135,672
[45] Date of Patent: *Oct. 24, 2000

[54] METHOD OF AND TURF PRODUCT FOR EROSION CONTROL

[75] Inventor: Lynn Malcolm Davidson, Acacia Ridge, Australia

[73] Assignee: Jimboomba Turf Company Pty. Limited, Acacia Ridge, Australia

[*] Notice: This patent issued on a continued prosecution application filed under 37 CFR 1.53(d), and is subject to the twenty year patent term provisions of 35 U.S.C. 154(a)(2).

[21] Appl. No.: 08/860,837

[22] PCT Filed: Jan. 5, 1996

[86] PCT No.: PCT/AU96/00004

§ 371 Date: Jun. 16, 1997

§ 102(e) Date: Jun. 16, 1997

[87] PCT Pub. No.: WO96/20586

PCT Pub. Date: Jul. 11, 1996

[30] Foreign Application Priority Data

Jan. 5, 1995 [AU] Australia .................. PN0374

[51] Int. Cl.⁷ ......................................... A01G 1/12
[52] U.S. Cl. .................. 405/19; 405/258; 47/56
[58] Field of Search ................. 405/15, 16, 19, 405/258; 47/56

[56] References Cited

U.S. PATENT DOCUMENTS

| | | | |
|---|---|---|---|
| 1,971,504 | 8/1934 | Pratt | 47/56 |
| 2,605,589 | 8/1952 | Kuestner | 47/56 |
| 2,909,003 | 10/1959 | Marshall | 47/56 |
| 2,923,093 | 2/1960 | Allen | 47/56 |
| 3,845,584 | 11/1974 | Mercer | 47/56 |
| 3,889,417 | 6/1975 | Wood et al. | 47/56 X |
| 4,309,844 | 1/1982 | King et al. | 47/56 |
| 4,364,197 | 12/1982 | Baron | 47/56 |
| 4,414,776 | 11/1983 | Ball | 47/56 |
| 4,916,855 | 4/1990 | Halliday et al. | 405/258 X |
| 5,094,569 | 3/1992 | Fleming | 405/258 |
| 5,205,068 | 4/1993 | Solomou | 47/56 |
| 5,226,255 | 7/1993 | Robertson | 47/56 |
| 5,249,893 | 10/1993 | Romanek et al. | 405/258 |
| 5,401,281 | 3/1995 | Chamoulaud | 47/56 X |
| 5,417,010 | 5/1995 | Ecer | 47/56 |
| 5,507,845 | 4/1996 | Molnar et al. | 405/258 X |

FOREIGN PATENT DOCUMENTS

| | | |
|---|---|---|
| 464817 | 3/1973 | Australia . |
| 465785 | 10/1974 | Australia . |
| 4082385 | 10/1985 | Australia . |
| 3554984 | 6/1986 | Australia . |
| 7358891 | 9/1991 | Australia . |
| 2357092 | 4/1994 | Australia . |
| 2552620 | 4/1985 | France . |
| 9209193 | 6/1992 | WIPO . |

*Primary Examiner*—Eileen D. Lillis
*Assistant Examiner*—Tara L. Mayo
*Attorney, Agent, or Firm*—Edwin D. Schindler

[57] ABSTRACT

A turf product for use in erosion control is provided as a turf product matting of a fibrous material in combination with a reinforcing mesh for giving directional stability thereto. Turf is located above the matting and the reinforcing mesh with its root system passing thereinto. The turf is initially grown above the matting and the reinforcing mesh with its root mass passing therethrough onto an impervious surface. The impervious surface acts as a barrier to root transmission, so that the roots tend to mat above the impervious surface, and when the turf product is moved to its required location for use, the roots are then permitted to pass into an underlying surface.

9 Claims, 1 Drawing Sheet

METHOD OF AND TURF PRODUCT FOR EROSION CONTROL

BACKGROUND OF THE INVENTION

1. Technical Field of the Invention

This invention relates to a method of erosion control and a turf product which is specifically adapted for use in the erosion control area.

2. Description of the Prior Art

It is often desirable to retain soil in areas where erosion is likely, say, in banks or cuttings or the like around roadwork so that the area can be stabilised and growth can be encouraged and subsequently act to bind the soil of the area against later damage.

Various approaches have been taken to do this. For example, the location of a netting fabric over the surface, placing other material, such as, say, wood chips over the surface and possibly retaining these with a netting or the like and direct planting of shrubs or the like onto the surface.

If it has been required to grass the surface, this has been done by placing turf thereover but, in general terms, this has not necessarily been completely successful.

SUMMARY OF THE INVENTION

The principal object is to provide a turf product which can be used in various applications but which is particularly useful in the erosion control area and also to provide a method of erosion control which basically uses this turf product.

In its broadest sense, the invention includes a turf product comprising matting of a fibrous material in association with a reinforcing mesh to give directional stability thereto, and turf located above the matting and mesh with its root system passing thereinto and adapted to pass therethrough and into an underlying surface.

This combination provides a product which has good stability and can readily be handled but which, once located, is readily retained in its located position.

The invention also includes a method of manufacturing a turf product which includes the provision of an impervious layer, locating a root matting on the layer in association with a reinforcing mesh or the like, and locating thereover turf, the roots of which can pass through the mesh and matting combination and can provide a stable and strong product.

It is preferred that the turf is located on the mesh and matting combination in the form of a washed turf having a strongly formed root system but it would be possible to grow turf thereon either from seed or stolons if this is required.

The invention also includes a method of erosion control comprising preparing the surface to be protected and laying on this surface a turf product as hereinbefore described, the arrangement being such that the product will tend to remain on the surface without moving, although it can be pegged or otherwise connected thereto or could be top dressed with sand or soil to ensure that there was no movement, the arrangement being such that the root system of the turf passes through the matting into the ground's surface to thereby consolidate the surface.

In order that the invention may be more readily understood, we shall describe the formation of the product, the product itself, and its use.

BRIEF DESCRIPTION OF THE DRAWING FIGURES

Particular embodiments of the turf product will be described in terms of the accompanying drawings.

DETAILED DESCRIPTION OF THE DRAWING AND PREFERRED EMBODIMENTS

Figure 1:
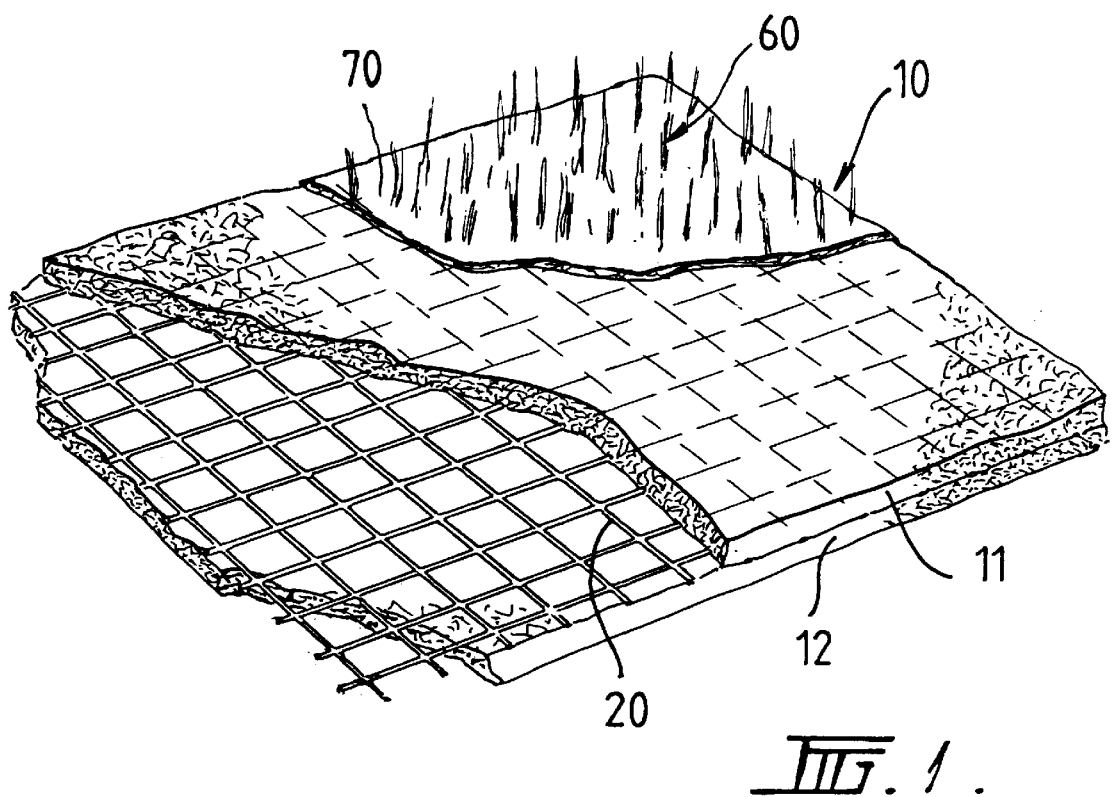
FIG. 1 is a schematic representation of a jute matting incorporating a reinforcing mesh.

In a preferred form of the turf 60 product turf, preferably in the form of washed turf, is lain (FIG. 1) over jute matting 10 which incorporates as an integral part thereof a plastic reinforcing mesh 20 which is effectively sandwiched between the upper 11 and lower 12 sides of the jute matting.

Although in this preferred embodiment jute matting is used it may be of sisal or could even be of plastic or any other appropriate fibres. The form and thickness of the mat can also vary depending upon the required strength of the completed product as can the reinforcing mesh.

Thus the precise material of the matting is not germane to this invention except that it is preferred that it be of some fibrous material, through which roots can readily pass, and which will of course mat appropriately. In addition the exact material of the reinforcing mesh can be varied as can the particular design of such a mesh although in this preferred embodiment of the invention the mesh has rectangular plastic elements.

Figure 2:
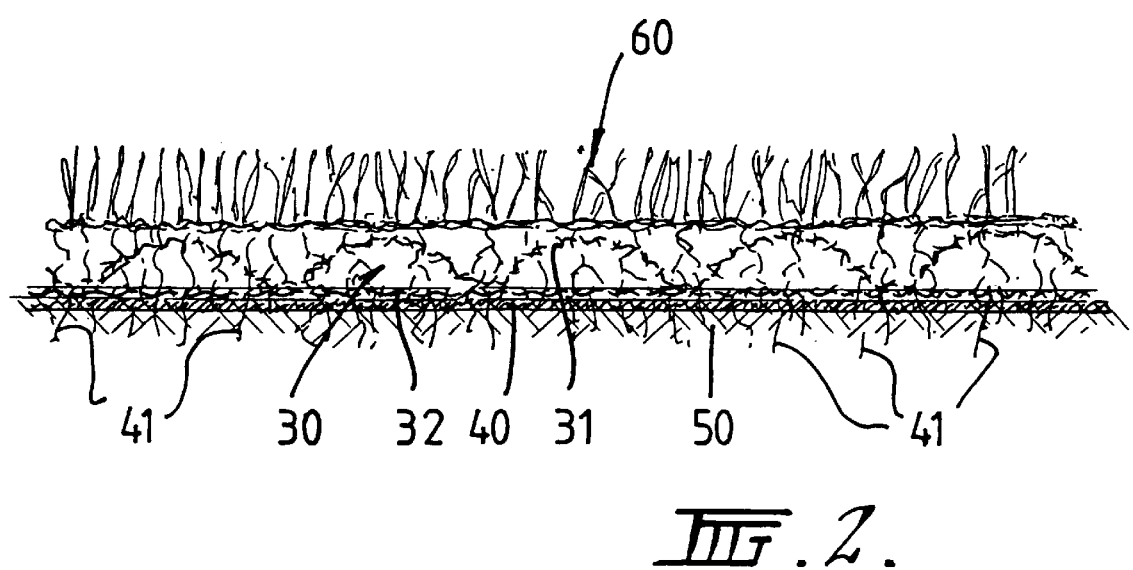
FIG. 2 is a schematic representation of an embodiment of the turf product with turf growing through a reinforcing mesh and an underlying matting.

In another embodiment of the invention (FIG. 2) a reinforcing mesh 30, which includes an underlying mesh layer 32 affixed to an overlying convoluted mesh layer 31, is positioned on a fibrous layer 40. The turf 60, preferably washed turf, is then positioned over the top of the reinforcing mesh layer such that its roots 41 subsequently grow through both the reinforcing mesh layer 30 and the fibrous layer 40 and are then able to penetrate into the ground 50 and bind the turf product to the ground.

Again the types of mesh and fibre used can be of any appropriate kind however a plastic reinforcing mesh of any chosen shape and a jute matting are preferred.

It is also preferred that the product be initially grown on an impervious surface 70 (FIG. 1) and a plastic sheeting surface or the like can be provided which acts to control water flow but which, at the same time, acts as a barrier against root transmission. In each of the embodiments described above the turf product can be grown above such an impervious layer.

If required, we could put top dressing such as sand on the turf, but in most applications this would not be necessary. The turf is then permitted to grow, under controlled or more or less controlled conditions to facilitate growth as much as possible. That is, a specific watering regime may be used and, if required, fertiliser can be applied to the surface, normally with the water.

We find that the root system of the turf rapidly passes through the mesh and mat combination and contacts the plastic or other impermeable surface, and tends to mat by moving along the area between the fibrous mat and the plastics material.

At this stage, there is provided a product which is inherently strong, the reinforcing mesh giving it directional stability and the combination of the roots and the mat providing an overall structural rigidity.

At that time, the product can be rolled and prepared for transport. Depending on the distance for transport and other parameters, the product may well be treated with chilled water before rolling, to bring the overall temperature down, and, after rolling, particularly if ambient temperatures are high or the distance to be travelled is great, could be placed in a refrigerated container or the like.

In use, it is only necessary to prepare the surface over which the product is to be laid, locate it, and unroll the product. Where there are a number of rolls being used, to make contact between the adjacent ends and sides of the rolls.

Depending on the surface on which the product is being located, it can be held relative to the surface by pins or pegs which pass through the product into the surface.

Because of the overall formation of the product and, specifically the reinforcing mesh, any tendency to move will be resisted, and because of the general weight of the product, this may be all that is required.

Alternatively, or as well, the product may be top dressed with sand or soil to provide additional weight and to act to further prevent movement.

As the root system enters the ground's surface then the product itself will resist any form of movement and, ultimately, there will be a high degree of binding between the surface and the product will then become integrally fixed to the surface.

If the product is being used on a relatively flat area, then, of course, it may well be unnecessary to take any steps whatsoever to hold the product.

It will be seen that the product of the invention is basically simple in concept but enables a ready method of consolidating surfaces vulnerable to erosion and particularly surfaces which would be difficult to grass, either by growing grass from seed or planting stolons, in both of which cases, should there be any rain, the seed in particular, can be washed off the surface and there can be erosion before there is sufficient coverage. With normal harvested turf, which does not have the structural rigidity of the turf product of the invention, there would be a tendency for movement under these circumstances.

What is claimed is:

1. A turf product matting comprising a fibrous material in combination with a reinforcing mesh for giving directional stability thereto, and turf located above the fibrous material and the reinforcing mesh with its root system passing thereinto, the turf being pre-grown turf having is roots washed free of soil, initially being located on the surface of the fibrous material, the root mass being permitted to grow and pass through the fibrous material and the reinforcing mesh onto an impervious surface which acts as a barrier to root transmission, so that the roots tend to mat above said impervious surface for providing, in combination with the fibrous material and the reinforcing mesh, structural rigidity for enabling the turf product to be readily moved to its required location, at which the root mass passes into an underlying surface.

2. A turf product as claimed in claim 1 in which the reinforcing mesh is incorporated within, and is integral to, the fibrous material.

3. A turf product as claimed in claim 1 in which the turf is located above the reinforcing mesh which is positioned on the fibrous matting with the root mass of the turf passing through both the mesh and the matting.

4. A turf product as claimed in claim 1 in which the fibrous matting is of jute.

5. A turf product as claimed in claim 1 in which the turf is a turf layer.

6. A turf product as claimed in claim 1 in which the turf is washed turf.

7. A turf product as claimed in claim 6 in which the turf is grown from seeds or stolons.

8. A turf product as claimed in claim 1 wherein when the turf is grown, the turf product is able to be rolled and packaged for transport to a remote site for use.

9. A turf product as claimed in claim 1 wherein when the turf product is moved to its required position, the turf product is then affixed to the underlying surface.

* * * * *